(12) United States Patent
Namihira (10) Patent No.: US 9,742,698 B2
(45) Date of Patent: Aug. 22, 2017

(54) SWITCH AND SETTING METHOD

(71) Applicant: FUJITSU LIMITED, Kawasaki-shi, Kanagawa (JP)

(72) Inventor: Daisuke Namihira, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 14/806,724

(22) Filed: Jul. 23, 2015

(65) Prior Publication Data

US 2015/0326502 A1    Nov. 12, 2015

Related U.S. Application Data

(63) Continuation of application No. PCT/JP2013/054163, filed on Feb. 20, 2013.

(51) Int. Cl.
| | |
|---|---|
| *H04L 12/933* | (2013.01) |
| *H04L 12/26* | (2006.01) |
| *H04L 12/46* | (2006.01) |
| *H04L 12/931* | (2013.01) |
| *H04L 12/947* | (2013.01) |

(52) U.S. Cl.
CPC ...... *H04L 49/1507* (2013.01); *H04L 12/4625* (2013.01); *H04L 43/0811* (2013.01); *H04L 49/25* (2013.01); *H04L 49/356* (2013.01); *H04L 49/65* (2013.01)

(58) Field of Classification Search
None
See application file for complete search history.

(56) References Cited

U.S. PATENT DOCUMENTS

| | | | | |
|---|---|---|---|---|
| 6,381,643 | B1* | 4/2002 | Bartfai | H04L 12/2697 340/502 |
| 7,698,408 | B1* | 4/2010 | Johnsen | H04L 12/2697 370/254 |
| 9,363,208 | B1* | 6/2016 | Judge | H04L 49/15 |
| 2002/0054591 | A1 | 5/2002 | Oyama | |
| 2002/0156888 | A1 | 10/2002 | Lee et al. | |
| 2003/0065814 | A1 | 4/2003 | Ishii | |
| 2004/0024852 | A1* | 2/2004 | Chen | H04L 12/24 709/220 |
| 2005/0237943 | A1* | 10/2005 | Sasagawa | H04L 12/462 370/242 |

(Continued)

FOREIGN PATENT DOCUMENTS

| | | |
|---|---|---|
| JP | 10-084355 | 3/1998 |
| JP | 11-252181 | 9/1999 |

(Continued)

OTHER PUBLICATIONS

Extended European Search Report dated Feb. 4, 2016 corresponding to European Patent Application No. 13876023.6, 6 pages.

(Continued)

*Primary Examiner* — Gary Mui
(74) *Attorney, Agent, or Firm* — Fujitsu Patent Center (57) ABSTRACT

A disclosed switch includes: plural ports each of which is connected to another apparatus; a determination unit that determines, for each of the plural ports, whether the port is connected to one of plural switches integrated logically; and a setting unit that sets, for each of the plural ports, a port type or propriety of use based on a result of determination by the determination unit.

8 Claims, 10 Drawing Sheets

(56) References Cited

U.S. PATENT DOCUMENTS

| | | | | |
|---|---|---|---|---|
| 2006/0274646 A1* | 12/2006 | Nakamura | ............... | H04L 1/22 |
| | | | | 370/216 |
| 2007/0183337 A1* | 8/2007 | Cashman | ............... | H04L 41/06 |
| | | | | 370/250 |
| 2009/0300187 A1 | 12/2009 | Yamada | | |
| 2013/0021922 A1 | 1/2013 | Nakashima et al. | | |
| 2013/0117427 A1* | 5/2013 | Amano | ............... | G06F 9/4416 |
| | | | | 709/223 |
| 2014/0105029 A1* | 4/2014 | Jain | .................... | H04L 43/0811 |
| | | | | 370/242 |

FOREIGN PATENT DOCUMENTS

| | | |
|---|---|---|
| JP | 2000-196626 | 7/2000 |
| JP | 2003-115855 A | 4/2003 |
| JP | 2009-290332 | 12/2009 |
| JP | 2013-026754 | 2/2013 |

OTHER PUBLICATIONS

Japanese Office Action mailed May 24, 2016 for corresponding Japanese Patent Application 2015-501136, with Partial English Translation, 6 pages.
International Search Report and Written Opinion of the International Searching Authority (Form PCT/ISA/210, Form PCT/ISA/237), mailed in connection with PCT/JP2013/054163 and mailed Mar. 26, 2013 (9 pages).

* cited by examiner

| PORT | 1 | 2 | 3 | 4 | ... | n |
|---|---|---|---|---|---|---|
| SETTING | INNER | INNER | INNER | INNER | ... | INNER |

FIG.8

| INNER PORT | ACTUAL CONNECTION |
|---|---|
| OUTER PORT | BLOCKING |

SWITCH AND SETTING METHOD

CROSS-REFERENCE TO RELATED APPLICATIONS

This application is a continuation application, filed under 35 U.S.C. section 111(a), of International Application PCT/JP2013/054163, filed on Feb. 20, 2013, the entire contents of which are incorporated herein by reference.

FIELD

This technique relates to a technique for setting switches automatically.

BACKGROUND

In a cloud service realized in recent data centers or the like, a large number of servers are deployed, and server resources are shared with a large number of customers. Therefore, also in a network directly connected to a large number of servers that has been arranged, a redundant network is to be constructed by arranging a large number of switches and setting plural routes to increase bandwidth.

Because a switch at the previous stage of a server is in a network of layer 2, when the redundant network is constructed as it is by setting plural routes, loop configuration occurs. Therefore, it is considered to use STP (Spanning Tree Protocol) or the like. However, when using STP, there is a problem that it is impossible to increase bandwidth because the redundant routes are blocked and cannot be used for communication. Therefore, a switch which is called a Fabric switch has appeared, in which the same kind of plural switches are logically integrated. The Fabric switch can use plural lines as redundant routes by exchanging states inside. By doing so, it becomes possible to construct a redundant network with wide bandwidth without using STP. Here, Fabric represents a network that is constructed by Fabric switches.

In switches included in a Fabric, ports connecting to other switches (hereinafter referred to as inner ports) and ports connecting to servers, terminals and other network apparatuses (hereinafter referred to as outer ports) are physically fixed or are defined for each port (an inner port or an outer port is defined for each port), and it is general to construct the Fabric based on them because this Fabric switch logically and virtually integrates plural switches into one.

Figure 1:
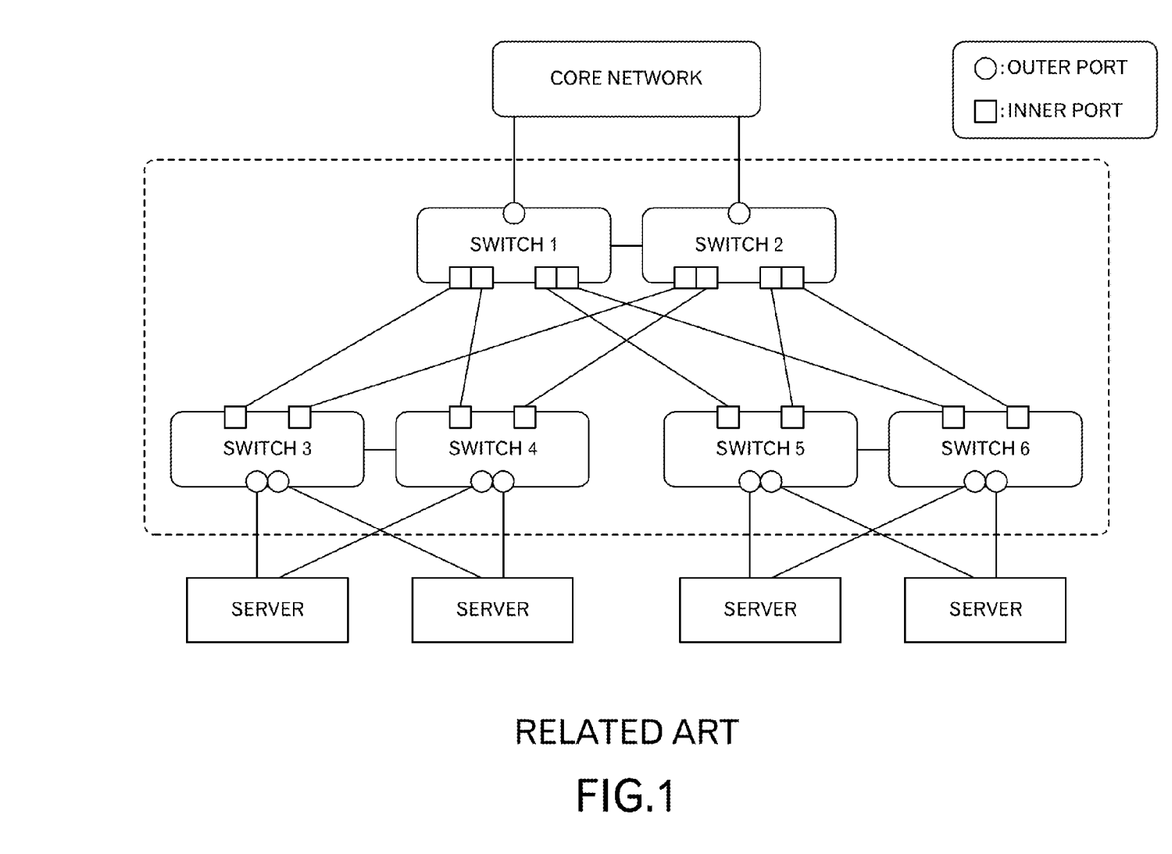
FIG. 1 is a diagram explaining Fabric.

For example, as illustrated in FIG. 1, switches 1 to 6 are Fabric switches, and a Fabric is constructed by these switches. The switches 1 and 2 are connected to a core network, and the switches 3 to 6 are connected to servers or storages. The switches 1 to 6 are connected to each other. Then, a port illustrated by a circle on each switch represents an outer port connected to the core network or the servers, and a port illustrated by a quadrilateral on each switch represents an inner port connecting between the Fabric switches.

This is because plural lines are effectively used between inner ports, and an inner port is shown as a special interface for exchanging information inside while an outer port is shown as an ordinary switch port.

Figure 2:
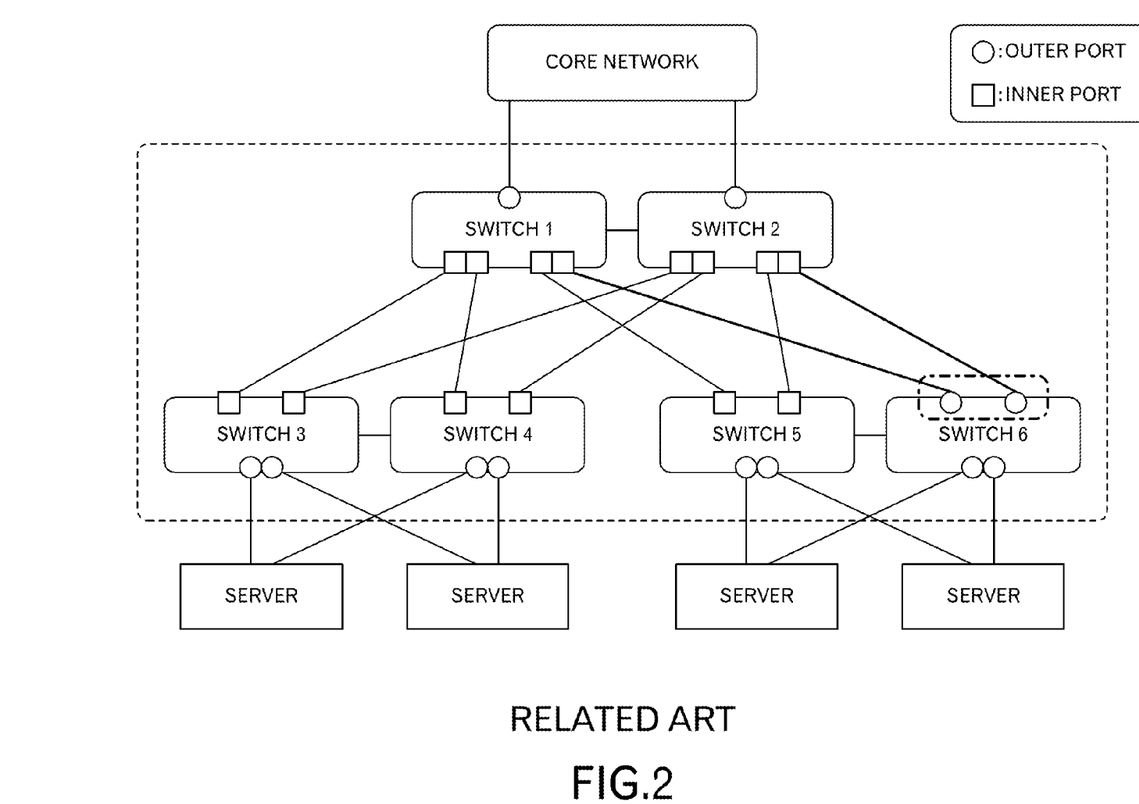
FIG. 2 is a diagram explaining a conventional problem.

However, in a Fabric switch that physically distinguishes an inner port from an outer port, it becomes impossible not only to operate the Fabric switch but also to construct Fabric when external apparatuses are connected to inner ports, or other Fabric switches are connected to outer ports, namely, when wrong connections occur. In the example illustrated in FIG. 2, it is impossible for the switch 6 to communicate with switches 1 and 2 and to join in the Fabric, because the outer ports of the switch 6 is connected to the switch 1 and 2 that are other Fabric switches. The same is true in a case where a port to be set as an inner port is set as an outer port in the switch 6. It takes time to investigate and to handle such connection errors and setting errors.

Figure 3:
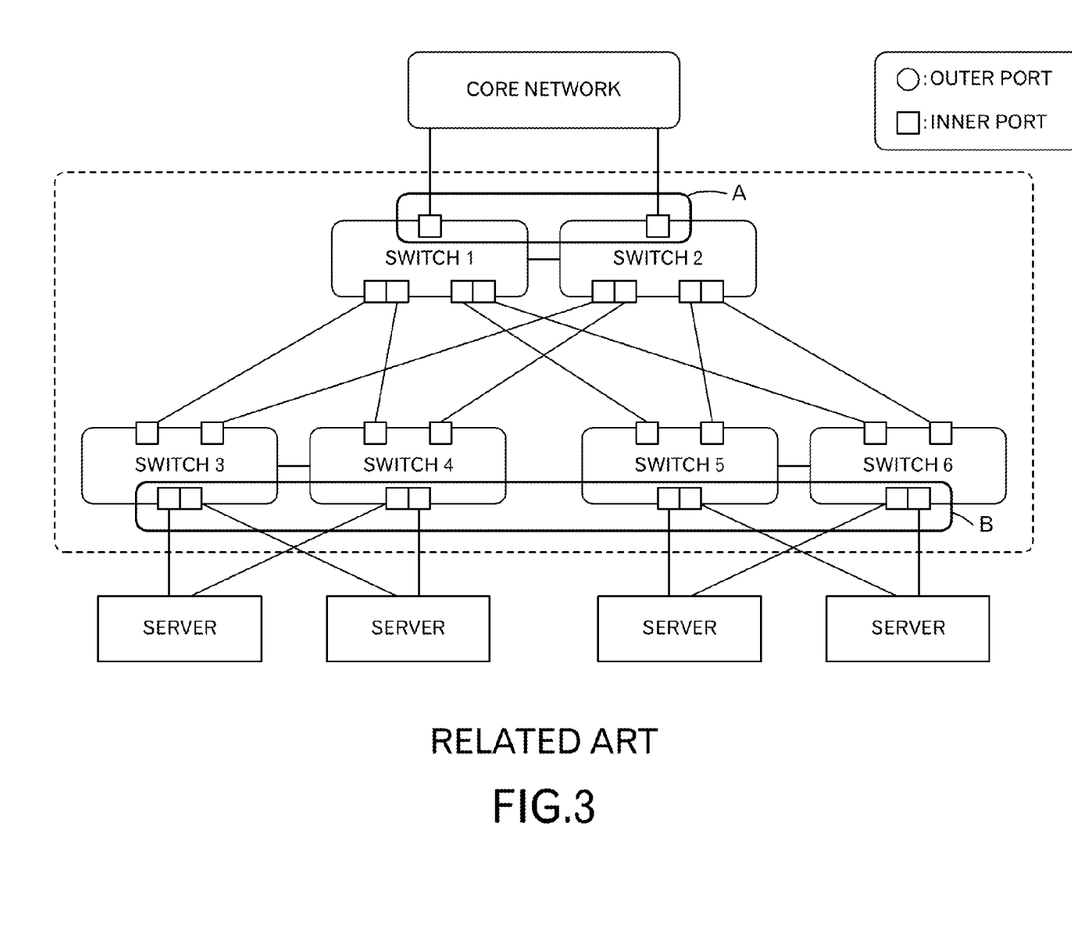
FIG. 3 is a diagram explaining a conventional problem.

Moreover, in a Fabric switch whose port is set as an inner port or an outer port by a definition, a setting of an inner port or an outer port is carried out individually according to configuration. For example, when all ports are set as inner ports by default, it is impossible to communicate even if the ports are connected to external apparatuses or the like because they are not outer ports. For example, as illustrated in FIG. 3, it is impossible to communicate as it is because the ports included in the port group A of the switches 1 and 2, which is connected to the core network, and the ports included in the port group B of the switches 3 to 6, which is connected to the servers, are initially set as inner ports. Therefore, initial setting processing becomes complex because the setting of the ports of the switches 1 to 6 are changed.

Figure 4:
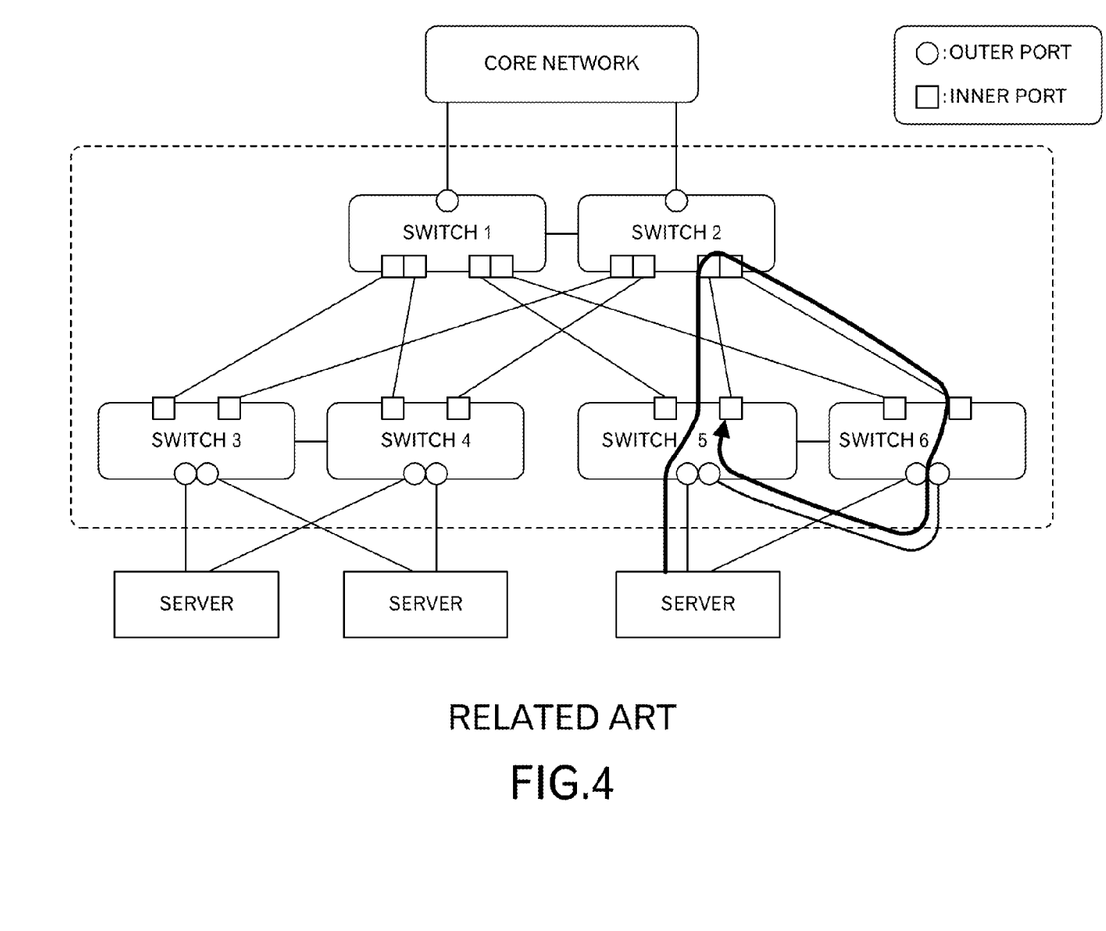
FIG. 4 is a diagram explaining a conventional problem.

Furthermore, when the ports are defined as outer ports although physical connections between ports were carried out as inner ports (namely, when wrong setting occurs), it means direct connection between ports in the same switch because Fabric is logically considered to be one switch. In other words, a loop of layer 2 occurs, and it is impossible to stop the loop until the connections are removed, or the definition is modified. Moreover, when lines are connected between the outer ports due to connection error or the like although ports are set as outer ports and are scheduled to connect to external apparatuses as illustrated by thick line arrows in FIG. 4 (that is, when wrong connection occurs), a loop occurs similarly and it influences communication performance in Fabric.

When Fabric switch is applied to a large scale system, the number of switches increases, and a possibility of wrong connection and definition errors dramatically increase. Then, it is a big problem for construction of a system if the loop occurs due to the wrong connection or the definition error and a state of no communication continues for a long time by them, because it is difficult to check the Fabric.

Patent Document 1: Japanese Laid-open Patent Publication No. 11-252181

Patent Document 2: Japanese Laid-open Patent Publication No. 2000-196626

SUMMARY

A switch includes relating to this technique includes: (A) plural ports each of which is connected to another apparatus; (B) a determination unit that determines, for each of the plural ports, whether the port is connected to one of plural switches integrated logically; and (C) a setting unit that sets, for each of the plural ports, a port type or propriety of use based on a result of determination by the determination unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 5:
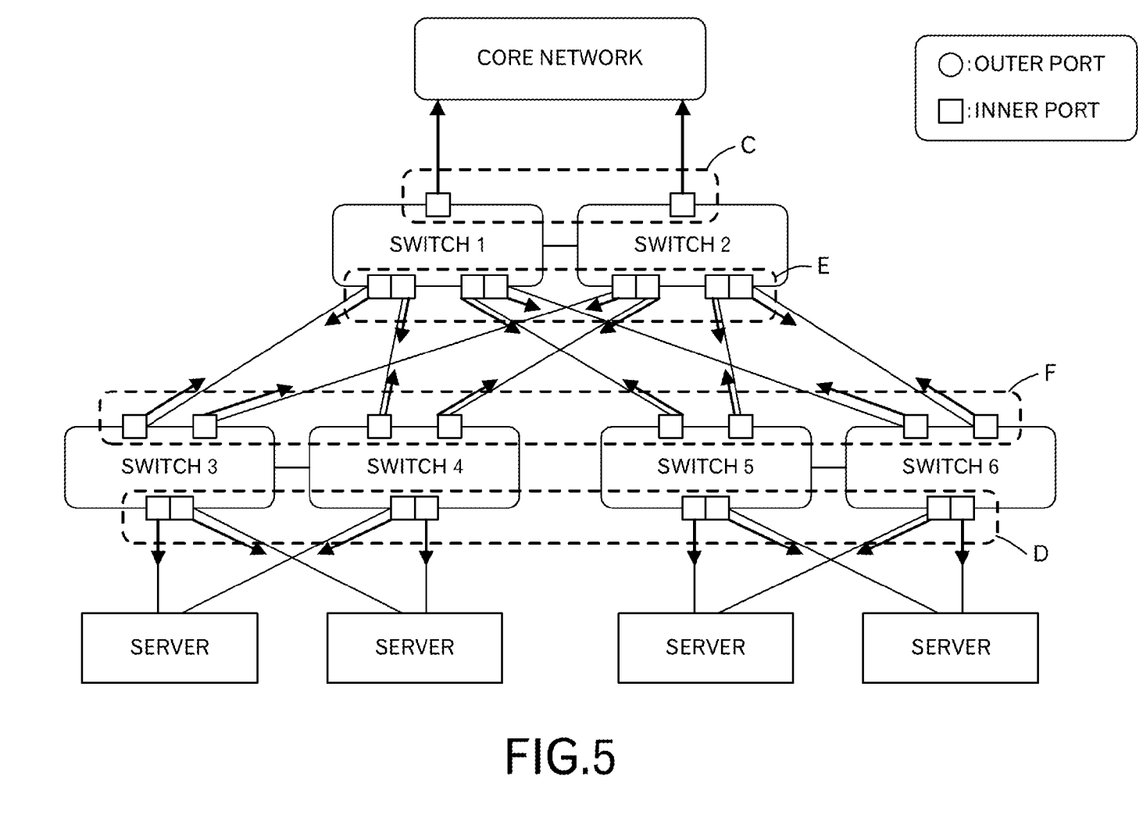
FIG. 5 is a diagram explaining operation of this embodiment.

In embodiments of this technique, after the switches 1 to 6 which are Fabric switches are physically connected to each other, or the setting of the switches is changed, the switches 1 to 6 confirm whether a connection destination of each port is a Fabric switch or not in spite of the port setting as schematically illustrated by an array of FIG. 5. Then, because it is possible to confirm that the connection destination of a port group E of the switches 1 and 2 and the connection destination of a port group F of the switches 3 to 6 are the Fabric switches, the ports are set as inner ports. If the ports are originally set as inner ports, the port groups E and F shift to a usable state.

Figure 6:
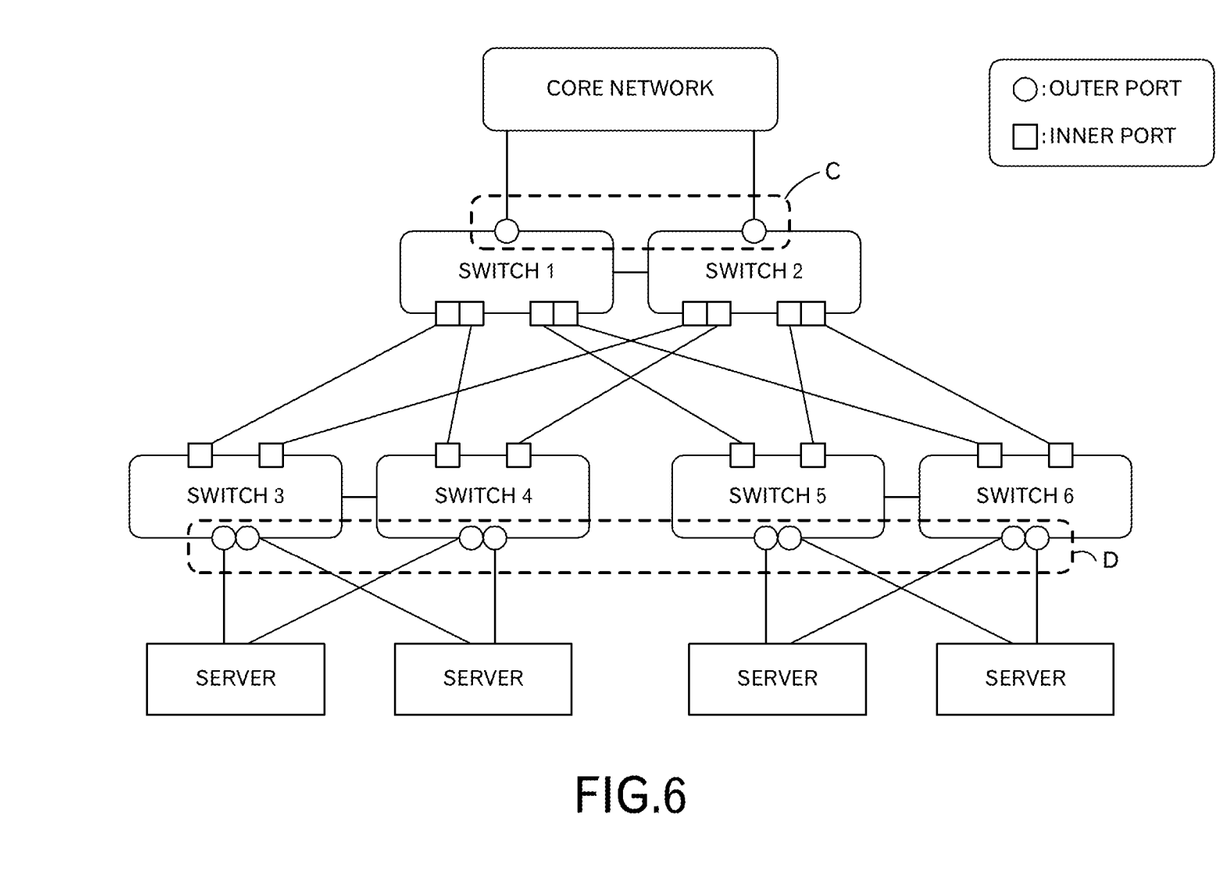
FIG. 6 is a diagram explaining operation of this embodiment.

On the other hand, because it is confirmed that the connection destination of a port group C including ports of the switches 1 and 2, which is connected to the core network, and the connection destination of a port group D including ports of the switches 3 to 6, which is connected to the servers and similar, are not the Fabric switches, they are set as outer ports. It means a shift from the state of FIG. 5 to the state of FIG. 6. If the ports are originally set as outer ports, the port groups C and D shift to a usable state.

When each port is set as an inner port or an outer port in advance and a port type that is different from the port type set in advance is identified, the port may be set as it is identified, or blocking (namely, an unusable state) may be set. When a port is identified as an outer port although the port is set as an inner port and when a case that a port is identified as an inner port although the port is set as an outer port, the port may be set as it is identified or the blocking may be set by a different policy.

In the following, configuration and operation of a Fabric switch to execute such operation will be specifically explained.

Figure 7:
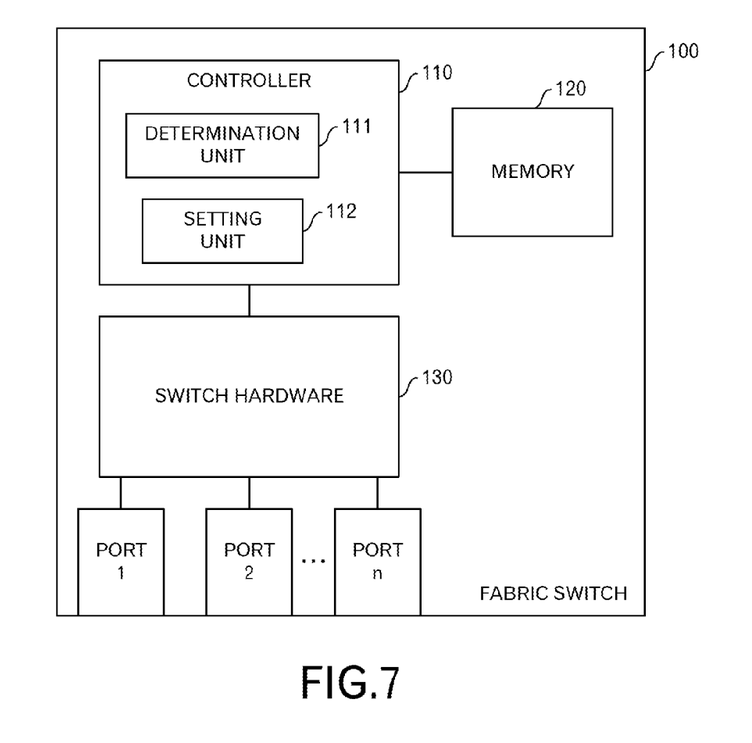
FIG. 7 is a diagram depicting configuration of a Fabric switch relating to this embodiment.

FIG. 7 illustrates an example of configuration of a Fabric switch 100 relating to this embodiment. The Fabric switch 100 includes a controller 110, a memory 120, switch hardware 130, and ports 1 to n. The controller 110 controls whole of the Fabric switch 100 including the switch hardware 130, and includes a determination unit 111 that executes determination processing for a port type and a setting unit 112 that executes setting processing for a port through the switch hardware 130. The controller 110 is realized by a combination of a processor and programs, for example. In this case, the programs stored in the memory 120 or other ROMs (Read Only Memory) are executed by the processor, and the controller 110 is realized. The memory 120 stores data or the like used in processing executed by the controller 110.

The switch hardware 130 is a semiconductor apparatus that communicates with other Fabric switches by its original format and that relays frames between ports. The ports 1 to n are connected with cables that connect other Fabric switches, external networks, servers, or the like.

Next, by using FIGS. 8 to 11, detail of the processing executed by the Fabric switch 100 relating to this embodiment will be explained.

For example, this processing is executed when the Fabric switch 100 is booted. However, when only a specified port is made to be in a state of link up, or when a definition of a port type is changed for only the specified port, this processing is executed for the specified port.

Figure 8:
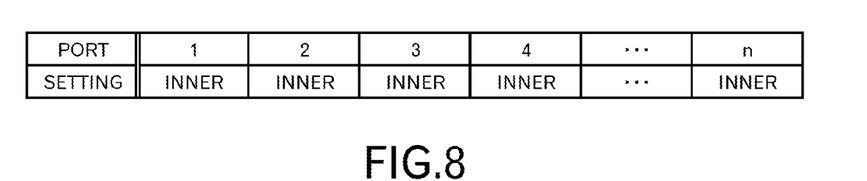
FIG. 8 is a diagram depicting an example of a port type setting.
Figure 9:
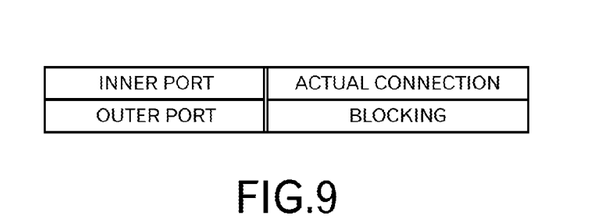
FIG. 9 is a diagram depicting an example of a setting policy when a definition conflict occurs.

For example, assume that ports are set as illustrated in FIG. 8. A port type is set for each port as illustrated in the example of FIG. 8. For example, there are not only a case that a port type is directly set for each port of the ports 1 to n but also a case that the same data as the example of FIG. 8 is stored in the memory 120. Furthermore, a setting about whether actual connections are prioritized or the blocking is set when a port which has been defined as an inner port is identified as an outer port (namely, when a definition conflict occurs) and a setting about whether actual connection is prioritized or the blocking is set when a port which has been defined as an outer port is identified as an inner port (namely, when a definition conflict occurs) are stored in the memory 120 as illustrated in FIG. 9.

Figure 10:
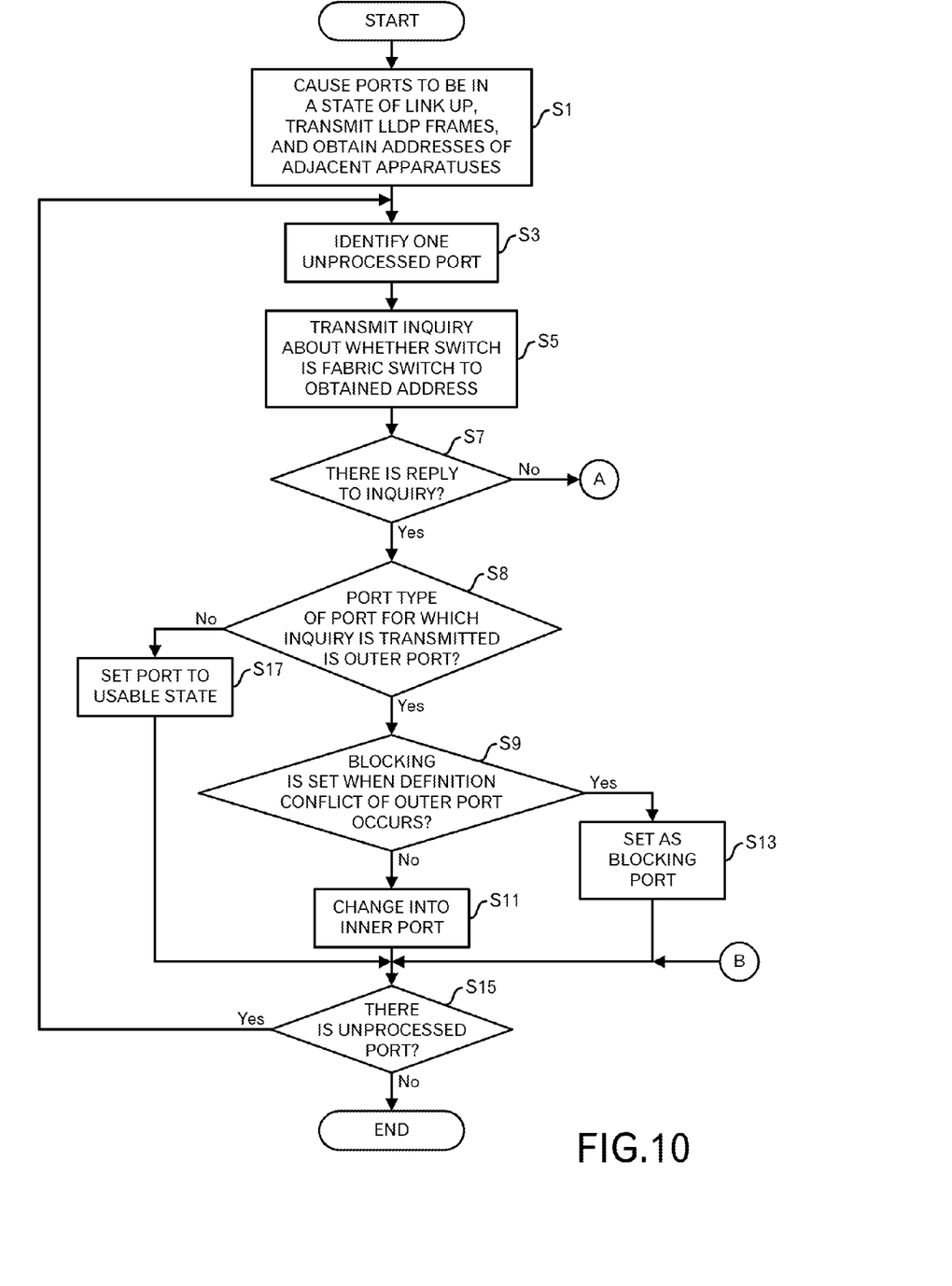
FIG. 10 is a diagram depicting a processing flow for operation of a Fabric switch relating to this embodiment.

Then, the controller 110 causes each port on the Fabric switch 100 to be in a state of link up through the switch hardware 130, transmits LLDP (Link Layer Discovery Protocol) frame to each port, and obtains addresses of adjacent apparatuses connected to each port (FIG. 10: step S1).

After that, the determination unit 111 included in the controller 110 identifies an unprocessed port (step S3), and transmits an inquiry about whether it is a Fabric switch to the address obtained for the port by a format interpretable by the Fabric switch (step S5). As described above, because the switch hardware 130 has a function to communicate with other Fabric switches by its original format, the determination unit 111 let the switch hardware 130 to transmit the inquiry.

When a port for which the inquiry is transmitted is connected to the Fabric switch, the Fabric switch which is a connection destination receives the inquiry through a pertinent port and the switch hardware 130, and the controller 110 replies to the inquiry similarly through the switch hardware 130 and the pertinent port.

Thus, although the Fabric switch can reply to the inquiry when the port for which the inquiry is transmitted is connected to the Fabric switch, apparatuses other than the Fabric switch cannot reply to the inquiry because the apparatuses cannot understand the inquiry. Therefore, the determination unit 111 determines whether the reply to the inquiry from the identified port is obtained (step S7). When it is determined that the reply is not obtained within a predetermined time, the processing shifts to the processing of FIG. 11 through a terminal A. No reply means that the port is connected to an external apparatuses that cannot understand the inquiry.

On the other hand, when it is determined that the reply is obtained, the determination unit 111 determines whether a port type of the port for which the inquiry is transmitted is defined as an outer port (step S8). Because obtaining the reply means that the port is connected to the Fabric switch, a definition conflict exists when the port type is defined as an outer port.

When it is determined that the port type is defined as an inner port (step S8: No route), the setting unit 112 sets the port for which the inquiry is transmitted as a usable state as it is (step S17). Then, the processing shifts to the step S15. In other words, the port is used as an inner port. This means there was no problem for connections, and the port can be used as it is.

On the other hand, when the port type is defined as an outer port (step S8: Yes route), the setting unit 112 determines whether there's a setting that the blocking is set when a definition conflict for the outer port occurs (step S9). When it is determined that there's a setting that the port is set according to the actual connections without blocking (step S9: No route), the setting unit 112 changes the port type of the port for which the inquiry is transmitted into an inner port (step S11). Thus, when a conflict between the actual connections and the setting occurs, the setting is preferably changed according to the actual connections. Then, the processing shifts to the step S15.

On the other hand, when it is determined that there's a setting that the blocking is set, the setting unit 112 set the port for which the inquiry is transmitted as a blocking port (step S13). In other words, the port is set as the unusable state. Because a problem like a loop can occur when connections are wrong, the port is preferably set as the blocking port. Then, the processing shifts to the step S15.

Then, the determination unit 111 determines whether there is an unprocessed port (step S15), and the processing returns to the step S3 when it is determined that there is an unprocessed port. On the other hand, when it is determined that there is no unprocessed port, the processing ends.

Figure 11:
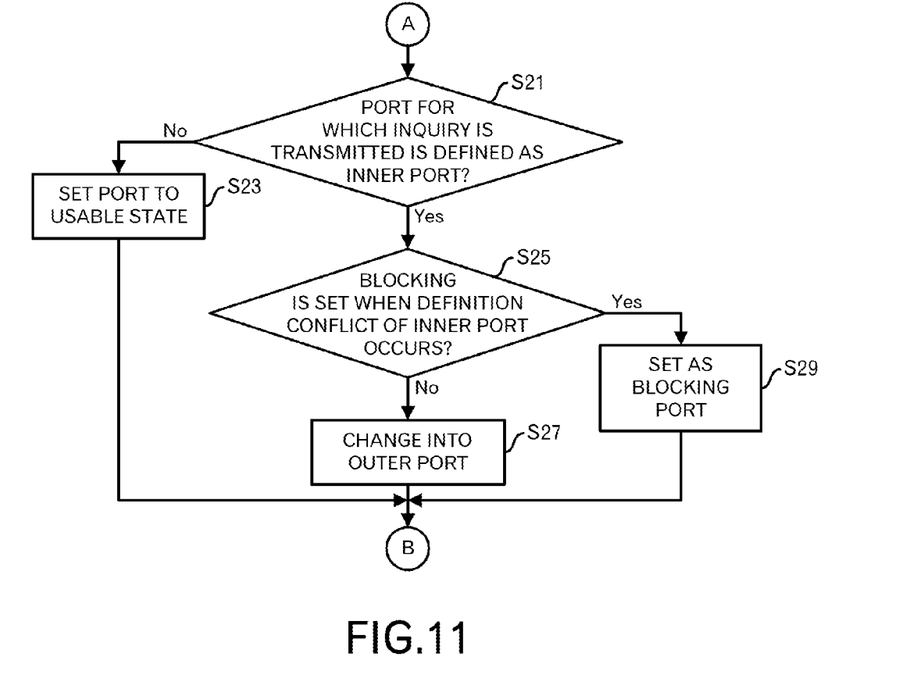
FIG. 11 is a diagram depicting a processing flow for operation of a Fabric switch relating to this embodiment.

Shifting to the explanation of the processing of FIG. 11, the determination unit 111 determines whether the port type of the port for which the inquiry is transmitted is defined as an inner port (step S21). Because no reply within the predetermined time means that the port is connected to an external apparatus, a definition conflict exists when the port type is defined as an inner port.

When it is determined that the port type is defined as an outer port (step S21: No route), the setting unit 112 set the port for which the inquiry is transmitted to a usable state as it is (step S23). Then, the processing returns to the step S15 of FIG. 10 through a terminal B.

On the other hand, when it is determined that the port type is defined as an inner port (step S21: Yes route), the setting unit 112 determines whether there's a setting that the blocking is set when a definition conflict for the inner port occurs (step S25). When it is determined that there's a setting that the port is set according to the actual connection without blocking, the setting unit 112 changes the port type of the port for which the inquiry is transmitted into an outer port (step S27). Thus, when the conflict between the actual connections and the setting, the setting may preferably be changed according to the actual connection. Then, the processing shifts to the step S15 of FIG. 10 through the terminal B.

On the other hand, when it is determined that there's a setting that the blocking is set, the setting unit 112 sets the port for which the inquiry is transmitted as the blocking port (step S29). In other words, the port is set as an unusable state. Because there is a possibility that a problem like a loop occurs when connections are wrong, the port may preferably be set as the blocking port. Then, the processing shifts to the step S15 of FIG. 10 through the terminal B.

By executing the processing as described above, it is possible to automatically set a port type based on actual connections regardless of initial setting.

In a network peripheral to servers deployed in a data center and a network of a general server system, the number of switches deployed on the preceding stage of servers increases as the number of the servers which have been deployed increases. Then, even if management is simplified by logically showing a switch as a Fabric switch, it takes time to detect a cause of a problem and an introduction cost increases, because it is difficult to decrease connection errors and port definition errors and a system operates even if there are a few definition errors. However, it becomes possible to reduce a cost by executing the processing described above.

However, if the blocking is preferable when a definition conflict occurs, it is possible to perform the blocking. Furthermore, setting may preferably be performed based only on actual connections. Furthermore, other method than the method as described above may be used to confirm whether an adjacent apparatus is a Fabric switch or not.

Although the embodiment of this technique was explained above, this technique is not limited to those. For example, the functional block diagram of the controller 110 in the Fabric switch 100 is a mere example, and the configuration in the functional block diagram does not always correspond to actual program module configuration.

As for the processing flow, as long as the processing results do not change, the turns of the steps may be exchanged or the steps may be executed in parallel.

Figure 12:
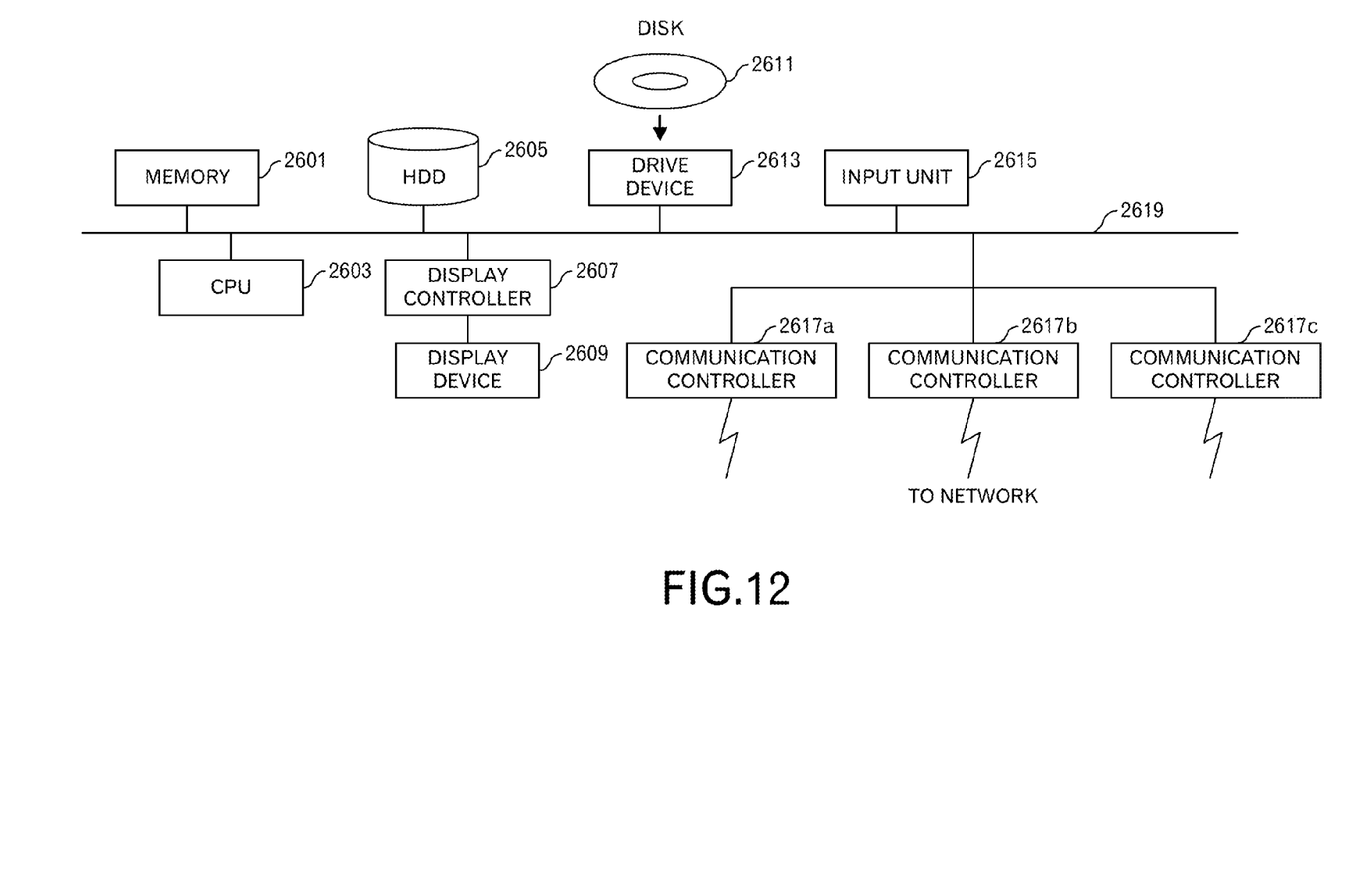
FIG. 12 is a functional block diagram for a case that a switch is implemented by a computer.

In addition, the aforementioned Fabric switch 100 is a computer apparatus as illustrated in FIG. 12, a memory 2601, CPU 2603, Hard Disk Drive (HDD) 2605, display controller 2607 to be coupled with a display device 2609, drive device 2613 for a removable disk 2611, input unit 2615 and communication controllers 2617 (2617a to 2617c in FIG. 12) for coupling to a network may be coupled with a bus 2619. Incidentally, according to circumstances, the display controller 2607, display device 2609, drive device 2613 and input unit 2615 may not be included. The OS and application programs for carrying out a processing in these embodiments are stored in the HDD 2605, and read out from the HDD 2605 to the memory 2601 when being executed by the CPU 2603. If necessary, the CPU 2603 controls the display controller 2607, communication controller 2617 and drive device 2613 to carry out necessary operations. Incidentally, data that was inputted through any one of the communication controllers 2617 is outputted through another communication controller 2617. The CPU 2603 controls the communication controllers 2617 to appropriately switch output destinations. In addition, data during the processing is stored in the memory 2601, and stored in the HDD 2605 if necessary. In the embodiments of this technique, the application programs for carrying out the aforementioned processing are distributed by a computer-readable removable disk 2611 storing the application programs, and the application programs are installed into the HDD 2605 through the drive device 2613. The programs may be installed into the HDD 2605 through the communication controller 2617 and the network such as the Internet. Such a computer apparatus realizes the aforementioned various functions by cooperating the hardware such as the CPU 2603, memory 2601 and the like with the OS and application programs if necessary.

The aforementioned embodiment is summarized as follows:

A switch relating to this embodiment includes: a memory; and a processor configured to use the memory and execute a process. And the process includes: determining, for each of plural ports each of which is connected to another apparatus, whether the port is connected to one of plural switches integrated logically; and setting, for each of the plural ports, a port type or propriety of use based on a result of the determining. By doing this, it becomes possible to automate setting of a Fabric switch.

Moreover, the determining may include: transmitting, for each of the plural ports, an inquiry that can be interpreted by the plural switches integrated logically; and determining, for each of the plural ports, whether a reply to the inquiry was obtained. Because the Fabric switch communicates using a predetermined format among Fabric switches logically integrated, the Fabric switch transmits the inquiry by the predetermined format. Then, it becomes possible to distinguish because apparatuses other than the Fabric switch cannot reply to the inquiry.

Furthermore, the setting may include: setting a port type of a first port for which the reply was obtained as a first port type that is a port type of a port connected to the plural switches integrated logically. Moreover, the setting may include: setting a port type of a second port for which the reply was not obtained as a second port type that is a port type of a port connected to an external apparatus or an external network. It becomes possible to automatically set when it is preferable to set according to actual connections. In other words, it becomes possible to avoid a problem on constructing the Fabric due to definition errors and wrong connections, and to prevent the loop occurring.

Furthermore, the setting may include: upon detecting that a port type of a first port for which the reply was obtained is set as a first port type that is a port type of a port connected to an external apparatus or an external network, causing the first port to be in an unusable state. Moreover, the setting may include: upon detecting that a port type of a second port for which the reply was not obtained is set as a second port type that is a port type of a port connected to the plurality of switches integrated logically in advance, causing the second port to be in the unusable state. It becomes possible to avoid errors on constructing the Fabric due to the wrong connections and to prevent the loop occurring.

Moreover, the setting may include: upon detecting that a port type of a first port for which the reply was obtained is set as a first port type that is a port type of a port connected to the plurality of switches integrated logically in advance, causing the first port to be in an usable state; and upon detecting that a port type of a second port for which the reply was not obtained is set as a second port type that is a port type of a port connected to an external apparatus or an external network, causing the second port to be in the usable state.

Incidentally, it is possible to create a program causing a processor to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. A switch, comprising:
a memory; and
a processor coupled to the memory and configured to:
transmit an inquiry from each of a plurality of ports each of which is connected to another apparatus, wherein the another apparatus is a first apparatus that transmits a reply to the inquiry and is one of a plurality of switches that are logically integrated, or a second apparatus that does not transmit the reply to the inquiry;
determine, for each of the plurality of ports, whether the reply to the inquiry has been received from the port; and
configure, for each of the plurality of ports, a port type or propriety of use based on a result of the determining.

2. The switch as set forth in claim 1, wherein the configuring comprises configuring a port type of a first port from which the reply to the inquiry has been received as a first port type that is a port type of a port connected to the plurality of switches that are logically integrated.

3. The switch as set forth in claim 2, wherein the configuring comprises configuring a port type of a second port from which the reply to the inquiry has not been received as a second port type that is a port type of a port connected to an external apparatus or an external network.

4. The switch as set forth in claim 1, wherein the configuring comprises upon detecting that a port type of a first port from which the reply to the inquiry has been received is configured in advance as a first port type that is a port type of a port connected to an external apparatus or an external network, causing the first port to be in an unusable state.

5. The switch as set forth in claim 4, wherein the configuring comprises upon detecting that a port type of a second port from which the reply to the inquiry has not been received is configured in advance as a second port type that is a port type of a port connected to the plurality of switches that are logically integrated, causing the second port to be in the unusable state.

6. The switch as set forth in claim 1, wherein the configuring comprises:
upon detecting that a port type of a first port from which the reply to the inquiry has been received is configured in advance as a first port type that is a port type of a port connected to the plurality of switches that are logically integrated, causing the first port to be in an usable state; and
upon detecting that a port type of a second port from which the reply to the inquiry has not been received is configured in advance as a second port type that is a port type of a port connected to an external apparatus or an external network, causing the second port to be in the usable state.

7. A non-transitory computer-readable storage medium storing a program that causes a computer to execute a process, the process comprising:
transmitting an inquiry from each of a plurality of ports each of which is connected to another apparatus, wherein the another apparatus is a first apparatus that transmits a reply to the inquiry and is one of a plurality of switches that are logically integrated, or a second apparatus that does not transmit the reply to the inquiry;

determining, for each of the plurality of ports, whether the reply to the inquiry has been received from the port; and configuring, for each of the plurality of ports, a port type or propriety of use based on a result of the determining.

8. A setting method, comprising:

transmitting, by a processor, an inquiry from each of a plurality of ports each of which is connected to another apparatus, wherein the another apparatus is a first apparatus that transmits a reply to the inquiry and is one of a plurality of switches that are logically integrated, or a second apparatus that does not transmit the reply to the inquiry;

determining, by the processor and for each of the plurality of ports, whether the reply to the inquiry has been received from the port; and configuring, by the processor and for each of the plurality of ports, a port type or propriety of use based on a result of the determining.

* * * * *